United States Patent
Chatterjee et al.

(10) Patent No.: US 8,524,189 B2
(45) Date of Patent: Sep. 3, 2013

(54) PROCESS FOR THE SELECTIVE OXIDATION OF HYDROGEN SULPHIDE

(75) Inventors: Arnab Chatterjee, Amsterdam (NL); Carolus Matthias Anna Maria Mesters, Amsterdam (NL); Ronald Jan Schoonebeek, Amsterdam (NL)

(73) Assignee: Shell Oil Company, Houston, TX (US)

( * ) Notice: Subject to any disclaimer, the term of this patent is extended or adjusted under 35 U.S.C. 154(b) by 49 days.

(21) Appl. No.: 13/131,130

(22) PCT Filed: Nov. 26, 2009

(86) PCT No.: PCT/EP2009/065933
§ 371 (c)(1), (2), (4) Date: Jun. 29, 2011

(87) PCT Pub. No.: WO2010/060970
PCT Pub. Date: Jun. 3, 2010

(65) Prior Publication Data
US 2011/0274604 A1 Nov. 10, 2011

(30) Foreign Application Priority Data

Nov. 28, 2008 (EP) .................................... 08170251
Nov. 28, 2008 (EP) .................................... 08170291

(51) Int. Cl.
*C01B 17/04* (2006.01)
*C10L 3/10* (2006.01)

(52) U.S. Cl.
USPC ....................................... 423/574.1; 48/127.7

(58) Field of Classification Search
USPC ....................................... 423/574.1; 48/127.7
See application file for complete search history.

(56) References Cited

U.S. PATENT DOCUMENTS

| 1,479,852 A | 1/1924 | Engelhardt |
| 3,790,659 A | 2/1974 | Storp et al. .................... 423/224 |

(Continued)

FOREIGN PATENT DOCUMENTS

| DE | 19544933 | 6/1997 |
| EP | 0215317 | 3/1987 |

(Continued)

OTHER PUBLICATIONS

Clark, P.D.; "Controlling $CO_2$ Emissions in large scale sour gas development"; Alberta Sulphur Research Limited, Quarterly Bulleting of ASRL; p. 45-55, Jun. 2008.

(Continued)

*Primary Examiner* — Timothy Vanoy
(74) *Attorney, Agent, or Firm* — Charles W. Stewart (57) ABSTRACT

The present invention provides a process for the selective oxidation of hydrogen sulphide contained in a hydrogen sulphide-containing hydrocarbon feed gas to elemental sulphur. The hydrogen sulphide-containing hydrocarbon feed gas and a sulphur dioxide-containing gas are supplied to a reaction zone containing a $TiO_2$-comprising catalyst, wherein elemental sulphur and a gaseous stream depleted in hydrogen sulphide are formed. The gas feeds are contacted with the $TiO_2$ containing catalyst at elevated pressure and at a temperature in the range of from 120 and below 160 ° C., under such conditions that the elemental sulphur formed is essentially in liquid form. At least part of the sulphur dioxide-containing gas is obtained by combusting elemental sulphur to obtain a gaseous mixture of sulphur dioxide and nitrogen and then concentrating the gaseous mixture to provide the sulphur dioxide-containing gas.

12 Claims, 2 Drawing Sheets

(56) References Cited

U.S. PATENT DOCUMENTS

| | | | |
|---|---|---|---|
| 4,280,990 A | 7/1981 | Jagodzinski et al. | 423/574 |
| 5,762,899 A | 6/1998 | Stetzer et al. | 423/573.1 |
| 5,928,620 A * | 7/1999 | Lynn | 423/574.1 |
| 6,645,459 B2 * | 11/2003 | Lynn | 423/574.1 |
| 6,776,974 B1 | 8/2004 | Burmaster et al. | 423/574.1 |
| 7,381,393 B2 * | 6/2008 | Lynn | 423/574.1 |
| 7,803,339 B2 * | 9/2010 | Carlsson | 423/244.09 |
| 8,298,505 B2 * | 10/2012 | Zhai et al. | 423/574.1 |
| 2004/0175307 A1 | 9/2004 | Laricchia et al. | 422/189 |
| 2011/0300059 A1 * | 12/2011 | Zhai et al. | 423/574.1 |

FOREIGN PATENT DOCUMENTS

| | | |
|---|---|---|
| EP | 0283793 | 9/1988 |
| JP | 8290904 | 11/1996 |
| WO | WO9202449 | 2/1992 |
| WO | WO9711028 | 3/1997 |
| WO | WO2006103217 | 10/2006 |
| WO | WO2007065884 | 6/2007 |

OTHER PUBLICATIONS

Connock, L; "Enhanced Sulphur Recovery"; British Sulphur Publishing; London, GB; No. 286; pp. 29-39; May 1, 2003.

Shields, et al.; "Catalytic H2S Conversion and $SO_2$ Production over Iron Oxide and Iron Oxide/Y-$Al_2O_2$ in Liquid Sulfur"; Ind. Eng. Chem. Res., 2007, 46, pp. 7721-7728.

Bacon, R.F. et al.; "The Viscosity of Sulfur"; J.Am. Chem. Soc. 65, pp. 639-648, 1943.

Touro et al.; "Viscosity-Chain Length Relationship in Molten Sulfur Systems"; J. Phys. Chem. 70 (1966) 239).

Sander, U.H.F. et al.; "Sulphur, Sulphur Dioxide and Sulphuric Acid, Chapter "Low-temperature Claus processes; British Sulphur Corp, London, GB, 1984.

* cited by examiner

# PROCESS FOR THE SELECTIVE OXIDATION OF HYDROGEN SULPHIDE

PRIORITY CLAIM

The present application claims priority from PCT/EP2009/065933, filed 26 Nov. 2009, which claims priority from European Application 08170291.2 filed 28 Nov. 2008 and 08170251.6 filed 28 Nov. 2008.

FIELD OF THE INVENTION

The invention relates to a process for the selective oxidation of hydrogen sulphide in a hydrogen sulphide-containing hydrocarbon and/or hydrogen feed gas to elemental sulphur.

BACKGROUND OF THE INVENTION

A known industrial process for the conversion of hydrogen sulphide is the so-called Claus process. In a Claus process hydrogen sulphide is reacted with sulphur dioxide to elemental sulphur and water according to the Claus reaction.

$$2H_2S + SO_2 \rightleftharpoons 2H_2O + 3/n S_n \quad (1)$$

Conventionally, this reaction is performed in several stages at temperatures in the rage of from 200 to 240° C. and at near atmospheric pressures.

In U.S. Pat. No. 4,280,990 is disclosed a process for removing hydrogen sulphide from a natural or industrial gas using a modified Claus process for reacting hydrogen sulphide with sulphur dioxide at temperatures of at least 160° C. and at elevated pressures in the presence of liquid sulphur. This is supported by Shields et al., Ind. Eng. Chem. Res., 2007, 46, p7721 to 7728, where it is shown for lean gas mixtures 0.95% hydrogen sulphide and 0.50% sulphur dioxide in nitrogen some hydrogen sulphide conversion (22.5%) could be obtained in the absence of hydrocarbons at a temperature of 135° C. and 296 kPa pressure.

Hydrogen sulphide is typically obtained as part of a larger volume of hydrocarbon feed gas, typically a hydrocarbon feed gas, such a natural gas. In all conventional Claus processes, including the process disclosed in U.S. Pat. No. 4,280,990, hydrogen sulphide is first separated from a hydrocarbon gas stream, e.g. by a solvent extraction process. After solvent regeneration, a hydrogen sulphide-rich gas is obtained which is dealt with in the Claus process. About one third of the hydrogen sulphide in this gas is oxidized with air to sulphur dioxide in a burner, according to:

$$2H_2S + 3O_2 \rightarrow 2H_2O + 2SO_2 \quad (2)$$

The sulphur dioxide subsequently reacts with the remaining hydrogen sulphide to elemental sulphur according to reaction (1).

The hydrogen sulphide has first to be separated from the remainder of the gas to prevent combustion of the hydrocarbons (or hydrogen) in the feed gas. It would be advantageous if hydrogen sulphide could be selectively oxidized, i.e. without the need to separate it from the remainder of the gas.

Shields et al., Ind. Eng. Chem. Res., 2007, 46, p7721 to 7728, disclose that hydrogen sulphide may be directly selectively oxidised using molecular-oxygen as oxidant in the presence of a catalyst and liquid sulphur. However, this has the disadvantage that the liquid sulphur is oxidised to sulphur dioxide due to reaction with the molecular-oxygen.

In P. D. Clark, Controlling $CO_2$ emissions in large scale sour gas developments, Alberta Sulphur Research Limited, Quarterly Bulletin of ASRL, June 2008, page 45 to 55, a high pressure Claus process is disclosed wherein a sour natural gas stream is processed to remove hydrogen sulphide. In this process one third of sour gas is combusted with pure oxygen to provide a gas comprising sulphur dioxide and water, the remaining two thirds of the sour gas are passed through a carbon bed to remove mercaptans and any other contaminants. Subsequently, the sulphur dioxide and water-comprising gas and the mercaptan-depleted sour gas are provided to a reactor and allowed to react over an alumina catalyst. It is suggested to use a hydrogen sulphide to sulphur dioxide ratio of more than 2 resulting in an effluent of the reactor comprising liquid sulphur, methane, carbon dioxide hydrogen sulphide and water.

There is a need in the art for a process for the direct selective oxidation of hydrogen sulphide, that is suitable for the deep desulphurisation of gaseous hydrocarbon or hydrogen-comprising streams with a relatively high hydrogen sulphide content, i.e. above 0.5 vol % and up to 25-50 vol %, which does not require the separation of hydrogen sulphide or mercaptans from the hydrocarbon-comprising feed nor requires to combust significant parts of the hydrocarbons in the hydrocarbon-comprising feed and wherein the oxidation of the liquid sulphur by the oxidant is prevented.

SUMMARY OF THE INVENTION

It has now been found that the above objective can be achieved by performing the catalytic selective oxidation with sulphur dioxide at a temperature of from 120 but below 160° C. such that the sulphur formed is essentially in liquid form and in the presence of a catalyst.

Accordingly, the invention is directed to a process for the selective oxidation of hydrogen sulphide in a hydrogen sulphide-containing hydrocarbon and/or hydrogen feed gas to elemental sulphur, wherein the hydrogen sulphide-containing hydrocarbon and/or hydrogen feed gas and a sulphur dioxide-containing gas are supplied to a reaction zone comprising at least one catalytic zone comprising a catalyst, to form elemental sulphur and a gaseous stream depleted in hydrogen sulphide, in which process the catalyst of the at least one catalytic zone is contacted with hydrogen sulphide and/or sulphur dioxide at elevated pressure and at a temperature in the range of from 120 and below 160° C., under such conditions that the elemental sulphur formed is essentially in liquid form, and wherein at least part of the sulphur dioxide comprising gas is obtained by combusting elemental sulphur to obtain a mixture of sulphur dioxide and nitrogen and concentrating the mixture of sulphur dioxide to increase the sulphur dioxide concentration.

In the process according to the invention hydrogen sulphide is selectively oxidized to sulphur according to exothermic reaction (1). The reaction is selective in the sense that compounds other than hydrogen sulphide, such as hydrocarbons or hydrogen, are not or hardly oxidized. This has the advantage that there is no need to separate hydrogen sulphide from the other gas components, such as in conventional Claus processes.

Reference herein to a hydrocarbon and/or hydrogen feed gas is to a gas comprising hydrocarbons, molecular hydrogen or both. The hydrocarbon and/or hydrogen feed gas is also referred to hereinbelow as feed gas.

Another advantage of the process according to the invention is that no additional sulphur dioxide is formed during the conversion of the hydrogen sulphide. The hydrogen sulphide is selectively oxidized to elemental sulphur.

Sulphur is formed essentially in liquid form. By ensuring that the sulphur formed is in a liquid form the catalyst remains accessible to the reactants and clogging of the catalyst or catalyst pores is prevented. Therefore, the process according to the invention is a continuous process, contrary to many prior art processes for sulphur removal from gas stream, which require a batch wise process in order to allow for periodical regeneration of the catalyst due to sulphur deposits on the catalyst.

In the process according to the invention any mercaptans present in the feed gas to the reactor are converted to polysulphides, elemental sulphur and water. The mercaptans are converted to polysulphides and optionally hydrogen sulphide. The hydrogen sulphide is subsequently reacted with sulphur dioxide. There is no need to separate mercaptans from the feed gas nor is there a need to provide for a separate mercaptan removal process subsequent to the process according to the invention.

By using a $TiO_2$ catalyst any COS or $CS_2$ present in the feed gas, the sulphur dioxide-containing gas supplied to the reactor or formed in the reactor is converted to $CO_2$ water and elemental sulphur. Both COS and $CS_2$ are catalytically hydrolysed in the presence of the $TiO_2$ catalyst to $CO_2$ and hydrogen sulphide. The hydrogen sulphide is subsequently reacted with sulphur dioxide. There is no need for a separate process to remove and/or convert COS or $CS_2$ either prior to or subsequent to the process according to the invention.

DETAILED DESCRIPTION OF THE INVENTION

In the process according to the invention, hydrogen sulphide is selectively oxidised to elemental sulphur and water by reacting, i.e. oxidizing, the hydrogen sulphide with sulphur dioxide. The process according to the operation can be operated continuously without the need to regenerate the catalyst, contrary to prior art processes that require periodical regeneration of the catalyst by removing sulphur form the catalyst pores. The reaction takes place in a reaction zone. The reaction zone comprises a catalytic zone comprising a catalyst, preferably a $TiO_2$-comprising catalyst, and the hydrogen sulphide-containing feed gas and the sulphur dioxide-containing gas are supplied to that catalytic zone. Preferably, the hydrogen sulphide-containing feed gas and the sulphur dioxide-containing gas supplied to the reactor, comprise no more than 1 mol % of water based on the number of moles sulphur dioxide present in the sulphur dioxide-containing gas supplied to the reactor, preferably no more than 0.5 mol %, more preferably essentially no water. Water is one of the reaction products of the reaction between hydrogen sulphide and sulphur dioxide and any water present in the gases supplied to the reaction zone negatively influences the equilibrium of reaction (1), by drawing the equilibrium toward the reactants side.

Equally important, if the partial pressure of water is too high, condensation of liquid water may take place. In the presence of liquid water, sulphurous acid may be formed as the sulphur dioxide dissolves in the liquid water. As a result, the pH in the reaction zone may be decreased. When operating in low pH environments, special consideration must be given to the construction materials due to corrosion phenomena. This may put constrains on the materials that can be used to construct the reactor and/or reaction zone and lead to an increased capital investment. As the reaction itself already produces water, any additional supply of water to the reactor zone should be limited, if not essentially prevented.

The hydrogen sulphide and sulphur dioxide are contacted with the catalyst, preferably a $TiO_2$-comprising catalyst, whereby the temperature of the catalytic zone is maintained in the range of from 120 and below 160° C. In the catalytic zone hydrogen sulphide is converted to elemental sulphur and water by reacting with the sulphur dioxide. By maintaining a temperature in the range of from 120 and below 160° C., the sulphur formed during the reaction is essentially liquid. The melting temperature of elemental sulphur is 112-120° C., the exact value depending on the crystal structure of the sulphur (CRC Handbook of Chemistry and Physics, 56th edition, 1975-1976). Therefore, the process temperature in the at least one catalytic zone is at least 120° C. At a temperature of about 159° C., elemental sulphur starts to polymerize and forms a substance of a high viscosity that is difficult to remove from the pores or from the surface of a catalyst and may result in clogging and deactivation of the catalyst. It is known in the art, from for example Bacon et al. (R. F. Bacon and F. Fanelli, J. Am. Chem. Soc. 65 (1943) 639) and Touro et al. (J. Phys. Chem. 70 (1966) 239) that the presence of hydrogen sulphide influences the viscosity of sulphur. Thus, the exact viscosity increase with temperature will inter alia depend on the hydrogen sulphide concentration. In the process according to the invention, the sulphur formed is essentially in liquid form. Essentially in liquid form means that the degree of sulphur polymerization is limited such that there is no build-up of highly viscous sulphur on the catalyst, i.e. sulphur which is so viscous that it prohibits access of the reactants to the catalytically active sites. Therefore, the temperature in the at least one catalytic zone is below 160° C.

The hydrogen sulphide reacts with the sulphur dioxide as shown in formula (1). This reaction is exothermic. Most of the heat released during the reaction is transported out of the catalytic zone together with the reaction products and the hydrogen sulphide depleted gas. However, in case of very high hydrogen sulphide concentrations it may be preferably to provide additional means of cooling. In that case, preferably, the hydrogen sulphide and sulphur dioxide are contacted with the catalyst in the presence of an inert liquid. The heat released by the exothermic oxidation reaction may at least partly be absorbed by the inert liquid medium. Due to the heat absorption by the inert liquid medium and, optionally, by additional cooling means, the temperature in the catalytic zone may be kept below the temperature at which a significant viscosity increase due to sulphur polymerization takes place, i.e. below 160° C.

Therefore, preferably, not only the reactants, i.e. a hydrogen sulphide-containing feed gas and a sulphur dioxide-containing gas, are supplied to a reaction zone comprising a catalyst for selective oxidation, but also an inert liquid medium. The inert liquid medium may in that case serve a dual purpose, i.e. besides absorbing heat that is released due to the exothermicity of the oxidation reaction, it may also remove the liquid sulphur formed from the catalyst, preferably a $TiO_2$-comprising catalyst.

The hydrogen sulphide-containing feed gas supplied to the process may also comprise mercaptans. In addition to the hydrogen sulphide, any mercaptans present in the gaseous stream may also be converted. Reference herein to mercaptans (RSH) is to aliphatic mercaptans, especially $C_1$-$C_6$ mercaptans, more especially $C_1$-$C_4$ mercaptans, aromatic mercaptans, especially phenyl mercaptan, or mixtures of aliphatic and aromatic mercaptans. The invention especially involves removal of methyl mercaptan (R=methyl), ethyl mercaptan (R=ethyl), normal- and iso-propyl mercaptan (R=n-propyl and iso-propyl) and butyl mercaptan (R=butyl) isomers.

Without wishing to be bound by any specific theory on mercaptan removal, it is believed that mercaptans, in particular methyl mercaptans, may be converted to hydrogen sulphide and polysulphides over the catalyst, preferably a $TiO_2$-comprising catalyst, by reacting with any liquid sulphur present. This may be produced sulphur or added sulphur. If no sulphur is added at the start of the process, initially no mercaptans will be converted. Mercaptan conversion will be initiated as soon as liquid sulphur has been produced. Any hydrogen sulphide formed during the conversion of the mercaptans is subsequently reacted with sulphur dioxide to elemental sulphur and water. The polysulphides are removed with the liquid sulphur or in case an inert liquid is present with the inert liquid, in particular when the inert liquid comprises elemental sulphur. In addition, it is believed that in particular the higher mercaptans may also be absorbed into the essentially liquid sulphur obtained, and removed therewith from the reaction zone. The removal of mercaptans, in particular the methyl mercaptans, provides the process of the present invention with an additional advantage over known Claus processes, wherein typically mercaptans are excluded from the hydrogen sulphide stream and thus need to be removed from the hydrocarbon feedstock in a separate process.

In addition to mercaptans also any COS or $CS_2$ present in the hydrogen sulphide-containing feed gas may be converted. Without wishing to be bound by any specific theory on the conversion of COS or $CS_2$, it is believed that, contrary to processes wherein an alumina based catalyst is used, these compounds are catalytically hydrolysed with water in the presence of the preferred $TiO_2$-comprising catalyst to carbon dioxide and hydrogen sulphide. The water required for the catalytic hydrolysis is provided by the reaction of hydrogen sulphide and sulphur dioxide.

$CS_2$ may also be formed in the reaction zone due to the reaction of methane or other hydrocarbon species present in the feed gas with sulphur. It is an advantage of the process according to the invention that $CS_2$ formed in the reaction zone is catalytically hydrolysed to carbon dioxide and hydrogen sulphide.

The liquid sulphur formed and the hydrogen sulphide depleted gas may be removed from the reaction zone separately or as a gas liquid mixture. Preferably, in case of the presence of an inert liquid, a gas-liquid mixture comprising a gaseous stream depleted in hydrogen sulphide and inert liquid medium with the sulphur formed dissolved in it, mixed with it or finely dispersed in it, is removed from the catalytic zone. The gas and liquid are separated into a gaseous stream depleted in hydrogen sulphide and a liquid stream comprising the liquid inert medium and sulphur. The liquid stream may comprise more than one liquid phase, for example a phase of inert liquid and a separate phase comprising liquid sulphur.

The gaseous stream may optionally be further treated to remove components like residual water, sulphur dioxide, COS and/or hydrogen sulphide by means known in the art.

If present, the inert liquid medium is preferably recycled to the catalytic zone. In case that the inert liquid medium is not liquid sulphur, at least part of the sulphur is preferably removed from the inert liquid medium before recycling it. In that case, the greater part of the sulphur may be separated from the liquid stream by phase separation.

The reaction zone of the process according to the invention may comprise two or more catalytic zones of oxidation catalyst in series. Hydrogen sulphide and sulphur dioxide are supplied to and contacted with the oxidation catalyst of each catalytic zone.

The use of several catalytic zones in series is advantageous in the case of a feed gas having a high content of hydrogen sulphide. In that case, several catalytic zones in series can provide for the possibilities of interstage cooling, interstage water separation, staged supply of feed gas or of sulphur dioxide-containing gas or a combination of two or more thereof.

In the case of several catalytic zones in series, at least part of the hydrogen sulphide-containing feed gas, at least part of the sulphur dioxide-containing gas and optionally an inert liquid medium are supplied to the first, i.e. the most upstream, catalytic zone, which is operated as hereinbefore described for the first embodiment.

Preferably, the effluent of the first catalytic zone, i.e. a mixture comprising hydrogen sulphide-depleted gas, optionally inert liquid medium and sulphur is sent to the second catalytic zone, optionally after cooling. The remainder of the feed gas and sulphur dioxide-containing gas is then supplied to the second catalytic zone. It will be appreciated that if there are more than two catalytic zones, the remainder of the feed gas and sulphur dioxide-containing gas may be divided over the second and further downstream catalytic zones. The effluent of the most downstream catalytic zone will be separated into a gaseous stream of hydrogen sulphide-depleted gas and a liquid stream comprising sulphur and optionally inert liquid medium. Any inert liquid medium is preferably recycled to the first catalytic zone, typically after sulphur removal.

It is possible to separate the effluent from each catalytic zone into gas and liquid and to recycle any inert liquid medium to that catalytic zone. If desired, new inert liquid medium can be supplied to the next downstream catalytic zone.

In the case of a very high hydrogen sulphide content of the feed gas, it might be advantageous to apply inter-stage water separation by separating an inter-stage effluent into its gaseous and liquid part and condense water from the gaseous part before it is supplied to the next downstream catalytic zone. Inter-stage water separation is preferably applied in combination with staged supply of the sulphur dioxide-containing gas and/or feed gas.

The process according to the present invention is very suitably for the removal of hydrogen sulphide from gaseous streams having a relatively high content of hydrogen sulphide, i.e. up to 80 volume %. Preferably, the hydrogen sulphide-containing feed gas comprises hydrogen sulphide in the concentration of from 0.1 to 50 volume %, more preferably of from 1 to 25 volume %, based on the total volume of the hydrogen sulphide-containing feed gas.

The hydrogen sulphide-containing feed gas is preferably supplied to one or more of the catalytic zones in the reaction zone at a gas hourly space velocity in the range of from 100 to 100,000 Nl/kg/h (normal liters of gas per kilogram of catalyst in that zone per hour), more preferably of from 150 to 50,000 Nl/kg/h, even more preferably of from 200 to 5,000 Nl/kg/h. Reference herein to normal liters is to liters of gas at conditions of Standard Temperature and Pressure, i.e. 0° C. and 1 atmosphere.

The amount of inert liquid medium supplied to a catalytic zone is preferably such that the ratio of gas-to-liquid supplied to that zone is in the range of from 10 to 10,000 Nl gas/kg liquid, more preferably of from 20 to 2,000 Nl gas/kg liquid. It will be appreciated that the exact gas-to-liquid ratio mainly depends on the amount of hydrogen sulphide that is to be oxidized in that catalytic zone, since the inert liquid has the function to absorb the reaction heat in order to keep the reaction temperature of that zone below the temperature at which a significant viscosity increase due to sulphur polymerization takes place, i.e. below 160° C.

The hydrogen sulphide-containing feed gas and the inert liquid medium will typically be supplied separately to the reaction zone. Alternatively, the hydrogen sulphide-containing feed gas may be contacted with the inert liquid medium before they are supplied to the reaction zone. In that case, part or all of the hydrogen sulphide may be dissolved in the inert liquid medium that is supplied to the reaction zone.

The inert liquid medium may be any liquid medium that is not substantially consumed under the process conditions and that does not substantially degrade the oxidation catalyst. At least part of the inert liquid medium should be in liquid form at the process conditions in order to be able to control the process temperature and to remove the sulphur formed from the reaction zone. The inert liquid medium may be the liquid sulphur reaction product of the selective oxidation reaction (1). The inert liquid medium may also be another liquid compound that is not substantially consumed under the process conditions. Examples of such liquids are paraffins like n-pentane, n-hexane, n-heptane, n-octane and mixtures thereof, refinery hydrocarbon streams such as naphtha or kerosine, crude oil, toluene, alkanol amines and sulfinol.

The inert liquid medium is preferably elemental sulphur. Liquid sulphur is a particular suitable inert liquid medium, because it avoids the need for separation of sulphur from the inert liquid medium and the inevitable separation losses. In addition sulphur dioxide dissolves well in liquid sulphur providing a fast transport of sulphur dioxide to the catalyst.

The preferred catalyst is a $TiO_2$-comprising catalyst. This catalyst has a high temperature stability, which is particular beneficial in case of unintended temperature rises in the reactor. Optionally the catalyst may comprise promoters for the hydrolysis reaction such as K. The catalyst may additionally comprise an oxide compound of one or more other metals, preferably vanadium, chromium, manganese, iron, cobalt, molybdenum or combinations thereof. More preferably, an oxide of iron or an iron comprising mixed metal oxide.

It is believed that the metal oxides enhance the reactivity of the catalyst and may act as a scavenger especially in the early stages of the reaction.

Each catalytic zone in the reaction zone of the process according to the invention may be in any form that is suitable for a three-phase reaction system, for example a trickle flow fixed catalyst bed or a slurry bubble column, i.e. a catalytic zone in the form of a slurry of particles of the catalyst in inert liquid medium. If the feed gas has a very high hydrogen sulphide content, for example above 10%, it might be preferred to apply additional cooling of the reaction zone, i.e. additional to the cooling effected by the supply of inert liquid medium. Additional cooling may for example be achieved by using a catalytic zone in the form of a multi-tubular reactor with a fixed bed of oxidation catalyst particles inside the tubes or on the shell side of the tubes and supplying coolant to the other side of the tubes. In a slurry bubble column, additional cooling may be achieved by providing the bubble column with cooling coils.

The present invention can be used to selectively oxidize hydrogen sulphide from various gaseous streams, for example light hydrocarbons, such as methane, ethane, propane, and gases derived from such light hydrocarbons; natural gas; gases derived from tar sand and shale oils; gases associated with crude oil production; coal derived synthesis gas; gases such as hydrogen or syngas (i.e. $H_2$ and CO and/or $CO_2$).

Preferably, the hydrocarbon and/or hydrogen feed gas, comprises at least 10 vol %, more preferably 25 vol %, even more preferably 50 vol % of hydrocarbons and/or hydrogen, based on the total volume of the hydrocarbon or hydrogen feed gas. More preferably, the hydrocarbon or hydrogen feed gas comprises in the range of from 10 to 99.9 vol % of hydrocarbons or hydrogen, more preferably in the range of from 40 to 99.5 vol %, even more preferably in the range of from 50 vol % to 99 vol % of hydrocarbons or hydrogen. It is preferred that the hydrocarbon and/or hydrogen comprising feed gas comprises hydrocarbons.

The feed gas may further comprise nitrogen, carbon dioxide, argon, helium and other inert gases.

The hydrogen sulphide-comprising feed gas may comprise other sulphur compounds such as mercaptans, typically in the range of from 4 ppmv to 5 vol % (based on the total volume of the feed gas), COS, typically in the range of from 0.1 to 5000 ppmv (based on the total volume of the feed gas), more typically of from 0.1 to 2500 ppmv, and/or $CS_2$.

The overall molar ratio of sulphur dioxide in the sulphur dioxide-containing gas and hydrogen sulphide in the feed gas that are supplied to the reaction zone is preferably in de range of from 0.1 to 10, more preferably 0.30 to 3.0, even more preferably of from 0.50 to 2.0. In order to enhance the conversion of mercaptans, COS and $CS_2$ the overall molar ratio is suitably, at least slightly, above the stoichiometric ratio of 0.50. As hydrogen sulphide may be one of the products of the mercaptan, COS or $CS_2$ conversion, keeping the sulphur dioxide to hydrogen sulphide ratio low draws the equilibrium of the mercaptan, COS and $CS_2$ conversions towards the products. Thus, a sulphur dioxide-to-hydrogen sulphide ratio in the range of from 0.51 to 10, or 0.51 to 1.5, or even of from 0.60 to 1.5, is particularly preferred.

If an above stoichiometric ratio of sulphur dioxide is used, the hydrogen sulphide depleted gaseous stream will comprise some sulphur dioxide. It might be preferred to remove such sulphur dioxide from this gas stream and, optionally recycle such sulphur dioxide back to the reaction zone. This may for example be done by leading the gas stream over an absorption bed comprising a hydrated iron sulphide compound or another metal sulphide compound that is converted to its oxide and elemental sulphur upon contacting it with sulphur dioxide. Such metal sulphide compounds that are suitable as sulphur dioxide absorbent are known in the art.

The hydrogen sulphide-depleted gas may be treated to remove any residual hydrogen sulphide. This may for example be done by leading the gas stream over an absorption bed comprising solid scavenger, e.g. zinc oxide. Other scavenger compounds including liquid scavengers and chelating agents, e.g. polymeric amino alcohols, iron oxide, $Fe_3+$ (EDTA), that are suitable as hydrogen sulphide absorbent are known in the art.

When an absorbent is substantially saturated with either sulphur dioxide or hydrogen sulphide, it may be regenerated and reused.

At least part of or, preferably, all of the sulphur dioxide in the sulphur dioxide-containing gas may be obtained by combusting at least part of the elemental sulphur obtained from the process. Depending on the desired sulphur dioxide concentration in the sulphur dioxide-containing gas, the obtained sulphur may be combusted using pure oxygen, air or oxygen-enriched air. If pure oxygen is used to combust the elemental sulphur, a pure sulphur dioxide gas is obtained. In order to omit the need to separate air to provide oxygen-enriched air or pure oxygen it is preferred to use air to combust the sulphur. The resulting combustion product is a gaseous mixture comprising predominantly sulphur dioxide, nitrogen and optionally residual oxygen (further also referred to as gas effluent or combustion gas effluent). This gaseous mixture may be separated or concentrated to increase the sulphur dioxide content, e.g. by removing the nitrogen. The sulphur dioxide can be concentrated by any process know in the art such as for example by using liquid absorption, e.g. the CanSolve process, adsorption, membrane separation or by condensation of the sulphur dioxide. Sulphur dioxide condenses at much higher temperatures, i.e. at approximately −10° C., than for instance nitrogen. Due to the high condensation temperature of sulphur dioxide, the post combustion separation of sulphur dioxide and nitrogen is preferred to the pre combustion separation of oxygen and nitrogen.

A most preferred manner for sulphur dioxide concentration is by contacting the gas effluent comprising sulphur dioxide (i.e. the mixture comprising sulphur dioxide and nitrogen) with an absorbing liquid for sulphur dioxide in a sulphur dioxide absorption zone to selectively transfer sulphur dioxide from the combustion gas effluent to the absorbing liquid to obtain sulphur dioxide-enriched absorbing liquid and subsequently stripping sulphur dioxide from the sulphur dioxide-enriched absorbing liquid to produce a lean absorbing liquid and the sulphur dioxide-containing gas.

One preferred the liquid absorbing liquid for sulphur dioxide comprises at least one substantially water immiscible organic phosphonate diester.

Another the liquid absorbing liquid for sulphur dioxide comprises tetraethyleneglycol dimethylether.

Yet another preferred absorbing liquid for sulphur dioxide comprises diamines having a molecular weight of less than 300 in free base form and having a pKa value for the free nitrogen atom of about 3.0 to about 5.5 and containing at least one mole of water for each mole of sulphur dioxide to be absorbed.

Stripping of sulphur dioxide from the sulphur dioxide-enriched absorbing liquid is usually done at elevated temperature. To provide a more energy-efficient process, steam generated in a heat recovery steam generator unit can be used to provide at least part of the heat needed for the stripping of sulphur dioxide from the sulphur dioxide-enriched absorbing liquid. The heat recovery steam generator unit can be any unit providing means for recovering heat from the hot exhaust gas and converting this heat to steam. For example, the heat recovery steam generator unit can comprise a plurality of tubes mounted stackwise. Water is pumped and circulated through the tubes and can be held under high pressure at high temperatures. The hot exhaust gas heats up the tubes and is used to produce steam.

Suitably, the heat recovery steam generator unit can be designed to produce three types of steam: high pressure steam, intermediate pressure steam and low pressure steam. Preferably, the steam generator is designed to produce at least a certain amount of high pressure steam, because high pressure steam can be used to generate power. Suitably, high-pressure steam has a pressure in the range of from 90 to 150 bara, preferably from 90 to 125 bara, more preferably from 100 to 115 bara. Suitably, low-pressure steam is also produced, the low-pressure steam preferably having a pressure in the range of from 2 to 10 bara, more preferably from to 8 bara, still more preferably from 4 to 6 bara. This low-pressure steam is used for the regeneration of the absorbing liquid comprising sulphur dioxide.

It is an advantage of the process according to the invention that the heat released during the exothermic oxidation of the sulphur can be used to produce electricity. The sulphur is combusted in the presence of oxygen and the hot combustion gas is used to generate power, thereby producing a gas effluent comprising sulphur dioxide. Suitably, combustion takes place in a combustion chamber, for example a combustion chamber of a gas turbine. The oxygen can originate from an oxygen-containing gas, which is supplied to the combustion chamber of the gas turbine.

In a preferred embodiment, using the hot combustion gas to generate power involves expanding the hot combustion gas in a gas turbine, usually via a sequence of expander blades arranged in rows, and using the expanded combustion gas to generate power via a generator. Hot exhaust gas is emitted from the gas turbine. Suitably, the hot exhaust gas has a temperature in the range of from 350 to 700° C., preferably from 400 to 650° C. The composition of the hot exhaust gas can vary, depending on the oxidant used to combusted the sulphur. Generally, the hot exhaust gas will comprise sulphur dioxide, and optionally nitrogen and carbon dioxide. The hot exhaust gas exiting the gas turbine may be processed further to recover heat. If the hot exhaust gas exiting the gas turbine is not further processed, it may be used as or as part of the sulphur dioxide-containing gas.

In a preferred embodiment, hot exhaust gas exiting the gas turbine is introduced into to a heat recovery steam generator unit, where heat contained in the hot exhaust gas is used to produce a first amount of steam. In this embodiment, the gas effluent exiting the heat recovery steam generator unit may be used as or as part of the sulphur dioxide-containing gas.

The gas effluent comprising sulphur dioxide may be subjected to a sulphur dioxide concentration step, thereby generating a sulphur dioxide-containing gas stream.

The produced electricity can be used to produce oxygen enriched air, pure oxygen or may be used to provide energy for the separation of sulphur dioxide and nitrogen. Therefore, contrary to prior art processes there is no need or at least a reduced need to combust part of the valuable natural gas to produce energy.

The sulphur dioxide concentration in the sulphur dioxide-containing gas is not critical. It will be appreciated that the preferred sulphur dioxide concentration depends primarily on the concentration of the hydrogen sulphide in the hydrogen sulphide containing gas. In the case of a very high content of hydrogen sulphide in the feed gas it is preferred to either use pure or substantially pure sulphur dioxide, in order to avoid a high concentration of nitrogen or other gases in the hydrogen sulphide depleted gas.

In the process according to the invention, the temperature in each catalytic zone is at least 120° C., but remains below 160° C., preferably the temperature is in the range of from 120 to 150° C., more preferably of from 120 to 135° C., even more preferably of from 125 to 135° C., at a temperature above 120° C., the hydrolysis reaction of COS is enhanced. Due to the exothermicity of the reaction between hydrogen sulphide and sulphur dioxide it is preferred maintain the temperature as low as possible, while maintaining a temperature above 120° C. At these relatively low temperatures, a higher conversion is obtained by drawing the equilibrium to the product side.

The process according to the present invention is operated at elevated pressure. An elevated pressure is required to provide a driving force, which allows to reactants to pass through the liquid sulphur formed at the catalyst interface. Preferably, the process is operated at a pressure in the range of from 4 to 200 bar (absolute), more preferably 10 to 150 bar (absolute), even more preferably in the range of from 10 to 60 bar (absolute). Most preferably, the operating pressure is in the range of from 10 to 40 bar (absolute). Such elevated pressures ensure that the reactants can still reach the catalyst surface because at elevated pressure the sulphur dioxide and hydrogen sulphide dissolve in the liquid sulphur and can reach the active surface of the catalyst, contrary to the prior art Claus process where the pressure is too low, i.e. near atmospheric. Too high pressures will induce the condensation of produced water. It will be appreciated that the exact choice of temperature and pressure is influenced by the partial pressure of produced water in the reaction zone.

It is an advantage of the process of the invention that hydrogen sulphide containing gas can be processed at the pressure at which it is produced or at which it becomes available. Natural gas can for example be processed at the pressure at which it is produced at the well and effluents from a hydroprocessing or gasification unit can be processed without depressurizing them.

The catalyst may be any suitable catalyst, such as known Claus catalysts, preferably alumina-comprising catalysts or $TiO_2$-comprising catalyst.

It will be appreciated that process and feed features described herein above for the first process according to the invention apply mutatis mutandis for the second process according to the invention.

DETAILED DESCRIPTION OF THE DRAWINGS

Figure 1:
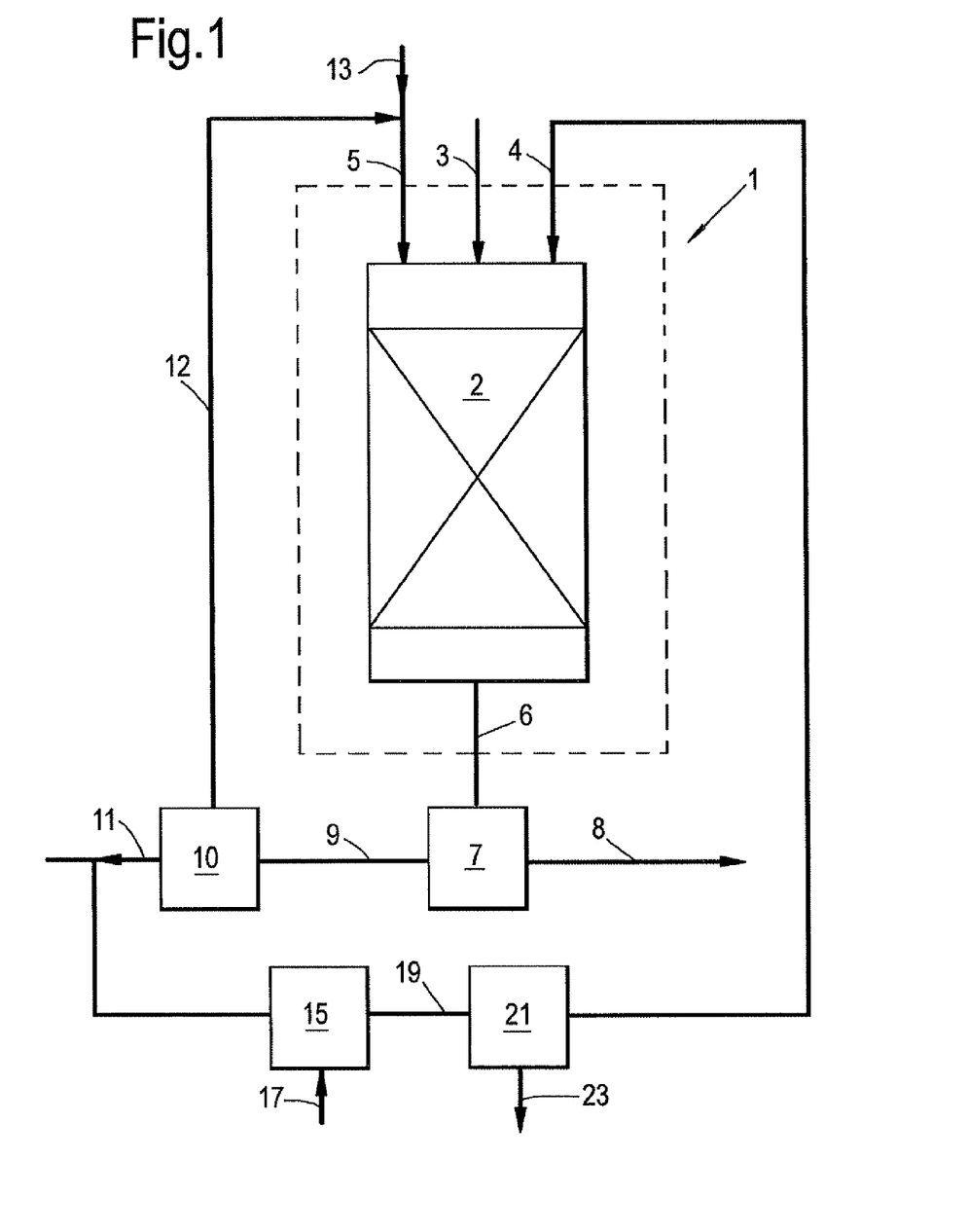
In FIG. 1 a process scheme is shown, wherein the reaction zone has a single catalytic zone.

In FIG. 1 is shown a reaction zone 1 having a single catalytic zone 2 in the form of a fixed bed of $TiO_2$ oxidation catalyst. A hydrogen sulphide-containing hydrocarbon and/or hydrogen feed gas 3, a stream 4 of sulphur dioxide-containing gas, and a stream 5 of inert liquid are supplied to catalytic zone 2. In catalytic zone 2, the hydrogen sulphide is selectively oxidized to liquid sulphur at a temperature in the range of from 120 and below 160° C. and at elevated pressure. Effluent 6 is discharged from catalytic zone 2 and separated in gas/liquid separator 7 into a gaseous stream 8 of hydrogen sulphide depleted gas and a liquid stream 9 of inert liquid and sulphur. At least part of the sulphur is separated from liquid stream 9 in separator 10 by means of phase separation. A stream 11 of sulphur is discharged from the process and a stream 12 of inert liquid is recycled to catalytic zone 2. A small stream 13 of inert liquid is added to stream 12 to make up for losses of inert liquid in streams 8 or 11. Part of the sulphur in stream 11 of sulphur is provided to sulphur combustor 15 and is combusted with air 17. Stream 19 comprising at least sulphur dioxide and nitrogen is provided to sulphur dioxide concentration unit 21. Concentrated stream 4 sulphur dioxide-containing gas exits sulphur dioxide concentration unit 21. The remainder of stream 19 exits the sulphur dioxide concentration unit 21 via stream 23.

Figure 2:
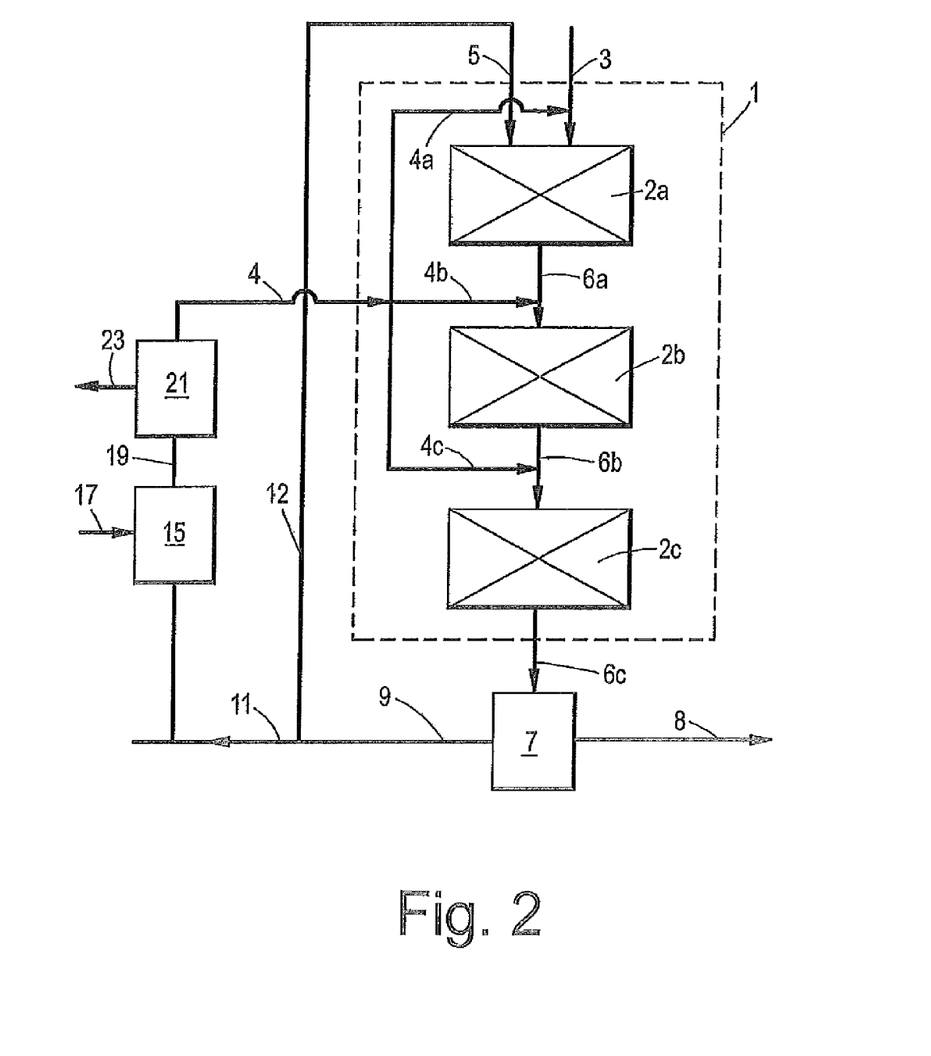
In FIG. 2 is shown a process scheme, wherein the reaction zone has three catalytic zones in series with staged feed of the sulphur dioxide-containing gas, and wherein liquid sulphur is used as inert liquid medium.

In FIG. 2 is shown a reaction zone 1 having three catalytic zones 2a-2c is series, wherein each zone 2a-2c is in the form of a fixed bed of oxidation catalyst. A hydrogen sulphide-containing hydrocarbon and/or hydrogen-containing feed gas 3, a stream 4 of sulphur dioxide-containing gas, and a stream 5 of liquid sulphur as the inert liquid medium are supplied to reaction zone 1. The feed gas 3 and liquid sulphur stream 5 are, together with a part 4a of the stream 4 of sulphur dioxide-containing gas, supplied to the most upstream catalytic zone 2a. A second part 4b of the stream 4 of sulphur dioxide-containing gas is supplied to the second catalytic zone 2b, together with effluent 6a from zone 2a. The remainder 4c of the stream 4 of sulphur dioxide-containing gas is supplied to the third catalytic zone 2c, together with effluent 6b from zone 2b.

In each catalytic zone 2a-2c, hydrogen sulphide is selectively oxidized to liquid sulphur at a temperature in the range of from 120 and below 160° C. and at elevated pressure. The effluents 6a-6c each are a gas/liquid mixture. Effluent 6c is discharged from catalytic zone 2c and separated in gas/liquid separator 7 into a gaseous stream 8 of hydrogen sulphide depleted gas and a stream 9 of liquid sulphur. A stream 11 of sulphur is discharged from the process and the remainder of the sulphur is recycled to catalytic zone 2a as stream 12. Part of the sulphur in stream 11 of sulphur is provided to sulphur combustor 15 and is combusted with air 17. Stream 19 comprising at least sulphur dioxide and nitrogen is provided to sulphur dioxide concentration unit 21. Concentrated stream 4 sulphur dioxide-containing gas exits sulphur dioxide concentration unit 21. The remainder of stream 19 exits the sulphur dioxide concentration unit 21 via stream 23.

In the embodiment shown in FIG. 2, the effluents 6a and 6b are supplied to the zones 2b and 2c, respectively, without separating the gas from the liquid phase. In an alternative embodiment (not shown), the effluents 6a and 6b are separated in their gaseous and liquid phase, water is separated from the gaseous phase in a condenser, and both the dried gaseous phase and the liquid phase are supplied to zones 2b and 2c.

EXAMPLES

The invention will be illustrated by the following non-limiting examples.

Example 1

The experiments were conducted in quartz reactor, which was made in one piece from quartz. A filter was inserted to prevent the loss of catalyst. In order to prevent premature reaction upstream of the reactor, the input of sulphur dioxide and hydrogen sulphide was separated until within the reactor by means of concentric feed pipes. The gases were then mixed in the chamber below the filter before passing through to the reactor section. The reactor had an internal diameter of 1.2 cm and a height of 21 cm. Total reactor volume was 100 ml. The whole reactor was set in an oven set at 130° C.

The temperature of the off-gas from the reactor was maintained at 110° C. until it reached the back pressure regulator in order to prevent water condensation. The off-gas was analyzed using an online GC. The GC system incorporated three separate detectors (Pulse Discharge and two Thermal Conductivity) with three separate columns (Mol sieve 5A, GasPro and Porapack Q). The gaspro column/PDD combination was used to separate and measure low concentrations of hydrogen sulphide, sulphur dioxide methanethiol and dimethyl disulphide (DMDS). The Mol sieve/TCD combination enabled the separation and measurement of high concentrations of methane and nitrogen. The PorapackQ/TCD combination allowed the measurement of high concentrations of hydrogen sulphide, sulphur dioxide, carbon dioxide and water. COS and $CS_2$ concentrations were determined separately. The reactor was pressurized using a nitrogen flow. At the start to the experiment the nitrogen flow was replaced by the reactants.

The quartz tube reactor was filled with catalyst particles together with inert particles (SiC) to create a catalyst bed with well-defined flow properties. The catalyst bed had a volume of 20.67 ml of which 6.88 ml (7.49 gr) were catalyst. The catalyst used was $TiO_2$ (P25). 1% Fe was added to the $TiO_2$ catalyst by impregnation. The pore volume for this catalyst was approximately 0.3 ml/gram. The reactor was in an up-flow configuration, where the gas flow was conducted from the bottom of the reactor.

Hydrogen sulphide and sulphur dioxide were supplied to the reactor separately. A 1.01 vol % (based on the total volume on the mixture) hydrogen sulphide in methane mixture and a 1.47 vol % (based on the total volume on the mixture) sulphur dioxide in methane mixture were used. The hydrogen sulphide/methane mixture additionally comprised small quantities of COS. The total flow rate was 7.75 Nl/hr. The sulphur dioxide to hydrogen sulphide ratio was chosen such that the process was operated in the presence of excess hydrogen sulphide. The obtained conversions of hydrogen sulphide and sulphur dioxide are given in Table 1. Essentially no sulphur dioxide could be detected in the off gas form the reactor indicating that all sulphur dioxide was converted. Hydrogen sulphide conversion was above 90%.

Example 2

Continuing the process of Example 1, the ratio of sulphur dioxide to hydrogen sulphide ratio was changed to provide an excess of sulphur dioxide. The obtained conversions of hydrogen sulphide and sulphur dioxide are given in Table 1. Due to the excess of sulphur dioxide, essentially all hydrogen sulphide was converted.

Example 3

Continuing the process of Example 2, methanethiol was added to the gas feed in the form of a 0.112 vol % (based on the total volume on the mixture) methanethiol in nitrogen mixture. The obtained conversions of hydrogen sulphide, sulphur dioxide and methanethiol and the COS content in the off-gas from the reactor are given in Table 1. As in Example 2, essentially all hydrogen sulphide is converted while the level of mercaptan in the off gas was below the detection limit of the GC.

Example 4

Continuing the process of Example 3, the ratio of sulphur dioxide to hydrogen sulphide ration was changed to provide an excess of hydrogen sulphide. The obtained conversions of hydrogen sulphide, sulphur dioxide and methanethiol and the COS content in the off-gas from the reactor are given in Table 1.

Example 5

Using the reactor and experimental procedure as described in Example 1, and experiment was done using a $TiO_2$ (P25) catalyst. A 7 vol % (based on the total volume on the mixture) hydrogen sulphide in methane mixture and a 3 vol % (based on the total volume on the mixture) sulphur dioxide in methane mixture were used. Nitrogen was added as a diluent. The reactor was in a down-flow configuration. The total flow rate was 8.02 Nl/hr. The obtained conversions of hydrogen sulphide, sulphur dioxide and the COS content in the off-gas from the reactor are given in Table 1. No COS was observed in the off-gas and sulphur dioxide conversion was essentially complete.

Example 6

Continuing the process of Example 5, the total flow rate was increased to 10.43 Nl/hr.

The obtained conversions of hydrogen sulphide, sulphur dioxide and the COS content in the off-gas from the reactor are given in Table 1. No COS was observed in the off-gas and sulphur dioxide conversion was essentially complete.

Example 7

Continuing the process of Example 6, the total flow rate was increased to 12.65 Nl/hr was further increased to induce a small COS slip. The COS content in the found to be 0.3 ppmV. Subsequently, the temperature was reduced to 120° C. As a result the COS content in the off-gas increased to 0.6 ppmV, while the sulphur dioxide and hydrogen sulphide conversion remained unchanged.

Example 8

For this experiment the same reactor set-up as described under Example 1 was used. The quartz tube reactor was filled with catalyst particles together with liquid sulphur to create a slurry catalyst bed. The catalyst bed had a volume of 34.05 ml of which 3.0 g was catalyst and 32.7 ml was liquid sulphur. The catalyst used consisted of $TiO_2$ (P25) particles sieved to give a 30-80 mesh. The reactor was in an up-flow configuration, where the gas flow was conducted from the bottom of the reactor.

At the start of the experiment a gas feed comprising 989 ppmV of methanethiol and a balance methane was supplied to the reactor at a flow rate of 10 Nl/hr. This gave a space velocity of approximately 3300 Nl/kgcat/hr. The methanethiol was allowed to react such that after 50 hours the a mixture of methanethiol, hydrogen sulphide and $CS_2$ was in contact with the catalyst to simulate a feed gas comprising hydrogen sulphide, mercaptan and $CS_2$. After 50 hours the off-gas of the reactor contained, besides methanethiol and $H_2S$, 11 ppm of $CS_2$. Subsequently, the feed gas was switched to a gas feed comprising 989 ppmV of methanethiol, 229 ppmV of sulphur dioxide and a balance methane was while maintaining the same flow rate. After, 53 hours no $CS_2$ could be detected in the off-gas. This shows that $CS_2$ is effectively converted in the process according to the invention.

TABLE 1

| expl | Gas feed | $SO_2/H_2S$ ratio | inert liquid medium | T (° C.) | p (bara) | $H_2S$ conversion (%) | $SO_2$ conversion (%) | $CH_3SH$ conversion (%) | COS in off-gas (ppmV) |
|---|---|---|---|---|---|---|---|---|---|
| 1. | 0.36 vol % $SO_2$ 0.78 vol % $H_2S$ balance $CH_4$ | 0.46 | Liquid sulphur* | 130 | 20 | 91.1 | >99.9 | | |
| 2. | 0.36 vol % $SO_2$ 0.70 vol % $H_2S$ balance $CH_4$ | 0.52 | Liquid sulphur* | 130 | 20 | >99.9 | 98.7 | | |
| 3. | 0.36 vol % $SO_2$ 0.70 vol % $H_2S$ | 0.52 | Liquid sulphur* | 130 | 20 | >99.9 | 97.0 | >98** | 2.5 |

TABLE 1-continued

| expl | Gas feed | SO₂/H₂S ratio | inert liquid medium | T (°C.) | p (bara) | $H_2S$ conversion (%) | $SO_2$ conversion (%) | $CH_3SH$ conversion (%) | COS in off-gas (ppmV) |
|---|---|---|---|---|---|---|---|---|---|
| 4. | 0.18 vol % CH₃SH balance CH₄/N₂ 0.36 vol % SO₂ 0.76 vol % H₂S | 0.47 | Liquid sulphur* | 130 | 20 | 96.5 | >99.9 | 40 | 3.45 |
| 5. | 0.17 vol % CH₃SH balance CH₄/N₂ 0.65 vol % SO₂ 1.33 vol % H₂S 38.90 vol % CH₄ balance N₂ | 0.49 | Liquid sulphur* | 130 | 21 | 98.0 | >99.9 | | >0.1*** |
| 6. | 0.66 vol % SO₂ 1.34 vol % H₂S 39.21 vol % CH₄ balance N₂ | 0.49 | Liquid sulphur* | 130 | 21 | 93.3 | >99.9 | | >0.1*** |

*as produced, no additional liquid sulphur added
**the CH₃SH content was below the detection limit
***the COS content was below the detection limit

What is claimed is:

1. A process for the selective oxidation of hydrogen sulphide in a hydrogen sulphide-containing hydrocarbon feed gas to elemental sulphur, wherein said process comprises: supplying the hydrogen sulphide-containing hydrocarbon feed gas and a sulphur dioxide-containing gas to a reaction zone comprising at least one catalytic zone comprising a $TiO_2$-comprising catalyst, wherein hydrogen sulphide is selectively oxidized with sulphur dioxide to form elemental sulphur and a gaseous stream depleted in hydrogen sulphide, by contacting the catalyst of the at least one catalytic zone with the hydrogen sulphide-containing hydrocarbon feed gas and the sulphur dixoide-containing gas at elevated pressure and at a temperature in the range of from 120 and below 160° C., under such conditions that the elemental sulphur formed is essentially in liquid form; and wherein at least part of the sulphur dioxide-containing gas is obtained by combusting elemental sulphur to obtain a gaseous mixture of sulphur dioxide and nitrogen and concentrating the gaseous mixture to provide the at least part of the sulphur dioxide-containing gas.

2. A process according to claim 1, wherein the reaction zone comprises two or more catalytic zones arranged in series.

3. A process according to claim 1, wherein the gaseous mixture of sulphur dioxide and nitrogen is concentrated by contacting the gaseous mixture of sulphur dioxide and nitrogen with an absorbing liquid within a sulphur dioxide absorption zone to selectively transfer sulphur dioxide from the gaseous mixture to the absorbing liquid to obtain sulphur dioxide-enriched absorbing liquid; and, subsequently, stripping sulphur dioxide from the sulphur dioxide-enriched absorbing liquid to produce a lean absorbing liquid and the sulphur dioxide-containing gas.

4. A process according to claim 1, wherein the hydrogen sulphide-containing hydrocarbon feed gas and the sulphur dioxide-containing gas supplied to the reactor comprise no more than 1 mol % of water based on the number of moles sulphur dioxide present in the sulphur dioxide-containing gas supplied to the reactor.

5. A process according to claim 1, wherein the hydrogen sulphide-containing hydrocarbon feed gas also comprises a sulphur compound selected from the group consisting of mercaptans, COS and $CS_2$.

6. A process according to claim 1, wherein elemental sulphur is supplied to the reaction zone.

7. A process according to claim 6, wherein the ratio of gas to elemental sulphur supplied to the catalytic zone is in the range of from 10 to 10,000 Nl/kg.

8. A process according to claim 1, wherein the hydrogen sulphide containing feed gas comprises hydrogen sulphide in a concentration of from 0.5 to 50 volume %, based on the total volume of the hydrogen sulphide-containing feed gas.

9. A process according to claim 1, wherein the hydrogen sulphide containing feed gas is contacted with the catalyst at a gas hourly space velocity in the range of from 100 to 100,000 Nl/kg/h.

10. A process according to claim 1, wherein the molar ratio of sulphur dioxide to hydrogen sulphide supplied to the catalytic zone is in the range of from 0.1 to 10.

11. A process according to claim 1, wherein the temperature in the catalytic zone is in the range of from 125 to 150° C.

12. A process according to claim 1, wherein the pressure in the catalytic zone is in the range of from 4 to 200 bar (absolute).

* * * * *